(12) United States Patent
Noguchi et al.

(10) Patent No.: US 7,434,831 B2
(45) Date of Patent: Oct. 14, 2008

(54) CURTAIN AIRBAG DEVICE

(75) Inventors: Atsushi Noguchi, Moriyama (JP); Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 349 days.

(21) Appl. No.: 11/149,228

(22) Filed: Jun. 10, 2005

(65) Prior Publication Data

US 2005/0275200 A1 Dec. 15, 2005

(30) Foreign Application Priority Data

Jun. 14, 2004 (JP) ............................... 2004-175679

(51) Int. Cl.
*B60R 21/20* (2006.01)
*B60R 21/213* (2006.01)
(52) U.S. Cl. ............... 280/730.2; 280/743.2; 280/728.2
(58) Field of Classification Search ............. 280/728.1, 280/728.2, 730.2, 743.2, 729
See application file for complete search history.

(56) References Cited

U.S. PATENT DOCUMENTS

| 6,010,149 | A | 1/2000 | Riedel et al. |
| 6,527,296 | B2 * | 3/2003 | Bakhsh et al. ............ 280/730.2 |
| 6,672,612 | B2 * | 1/2004 | Sauer et al. ............... 280/730.2 |
| 6,877,769 | B2 * | 4/2005 | Kim et al. ................. 280/730.2 |
| 6,962,364 | B2 * | 11/2005 | Ju et al. .................... 280/730.2 |
| 6,971,665 | B2 * | 12/2005 | Tanaka ....................... 280/729 |
| 2002/0027342 | A1 * | 3/2002 | Sauer et al. ............... 280/730.2 |
| 2002/0101066 | A1 * | 8/2002 | Tanase et al. ............. 280/730.2 |
| 2004/0178609 | A1 * | 9/2004 | Totsuka et al. ........... 280/730.2 |

FOREIGN PATENT DOCUMENTS

| DE | 93 21 654 U1 | 10/2002 |
| EP | 1 184 235 A1 | 3/2002 |
| JP | 2002-220023 | 8/2002 |

* cited by examiner

*Primary Examiner*—Ruth Ilan
(74) *Attorney, Agent, or Firm*—Foley & Lardner LLP

(57) ABSTRACT

A curtain airbag device for holding a vehicle occupant inside a vehicle cabin at a region of the curtain airbag. A front region of the curtain airbag may be provided with non-inflatable portions. Attachment parts may extending from an upper section, a lower section, and an intermediate section of a front edge of the curtain airbag an attach to a front pillar of the vehicle. When the curtain airbag is inflated, high tensions are generated at areas which are rear extensions of the attachment parts, whereby the front region of the curtain airbag forms a hammock-like structure.

18 Claims, 2 Drawing Sheets

CURTAIN AIRBAG DEVICE

BACKGROUND

The present invention relates to a curtain airbag device. The present invention also relates to a curtain airbag that, for example, inflates along a window on a side-door of a vehicle when the vehicle is involved in a side-on collision or rollover.

In a typical curtain airbag device the curtain airbag is disposed adjacent to an inner edge part of a vehicle cabin where the ceiling and a side surface meet. When gas is introduced into the curtain airbag through a gas-entrance hole, the curtain airbag inflates along, for example, a window on a side-door.

In addition to reducing impact by restraining, for example, the head of a vehicle occupant, this curtain airbag is capable of keeping a vehicle occupant inside the vehicle cabin (i.e. the airbag functions to hold a vehicle occupant inside a vehicle cabin).

Japanese Unexamined Patent Application Publication No. 2002-220023 (incorporated by reference herein) discloses a curtain airbag device having a curtain airbag whose rear portion is provided with a triangular non-inflatable fabric. A tip section of the triangular fabric is mounted on a roof-side rail.

According to this curtain airbag device, when the curtain airbag is to be inflated, a lower tip section of the triangular non-inflatable fabric is pulled downward. This creates high tension at the lower edge of the curtain airbag in the front-rear direction of the vehicle body. On the other hand, the tension at a region above the lower edge of the curtain airbag is relatively lower. This creates a state in which the curtain airbag has a hammock-like structure, and thus improves the function for holding a vehicle occupant inside a vehicle cabin.

SUMMARY OF THE INVENTION

It is an object of the present invention to provide a curtain airbag device in which a function for holding a vehicle occupant inside a vehicle cabin is further improved.

According to an embodiment of the present invention, a curtain airbag module may include a curtain airbag adapted to extend along a front pillar and a roof side of a vehicle, an inflator, wherein a front edge of the curtain airbag is adapted to extend along the front pillar and the airbag is provided with attachment parts that are disposed at multiple sections of a front edge with respect to a vertical direction, wherein the attachment parts are adapted to be mounted on the front pillar, and wherein the attachment parts are adapted to be mounted at a common intermediate position or adjacent intermediate positions of the front pillar with respect to the vertical direction.

In an embodiment of the present invention, a curtain airbag module includes an inflator, a curtain airbag adapted to extend along a side of a vehicle, wherein the airbag includes attachment parts adapted to be mounted to the vehicle, wherein the attachment parts create high tensile areas and low tensile areas at an end of the airbag to cause the airbag to act like a hammock and restrain an occupant within the vehicle.

According to an embodiment of the present invention, a curtain airbag includes a curtain airbag with attachment parts provided at an end of the airbag, wherein the attachment parts are adapted to be mounted on a vehicle and wherein the attachment parts create a tension at an end of the airbag to cause the airbag to act like a hammock and restrain an occupant within the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings. In the description below, the terms "front" and "rear" respectively correspond to the front and the rear of a vehicle in which the curtain airbag is installed. Arrow A indicates the direction of the front of the vehicle.

According to an embodiment of the present invention, when a curtain airbag 10 is in a folded state, the airbag extends from the front pillar to a rear end of a roof side of a vehicle. When the vehicle is involved in, for example, a side-on collision or rollover, the airbag 10 is deployed along an inner side surface of the vehicle cabin so as to form a substantially rectangular curtain that covers an upper half of the inner side surface of the vehicle cabin.

Figure 1A:
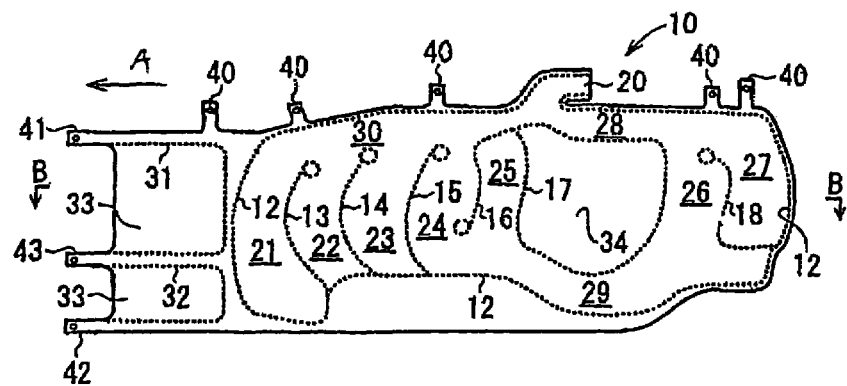
FIG. 1A is a side view of a curtain airbag according to an embodiment of the present invention in which attachment parts are not mounted on a front pillar.
Figure 1B:
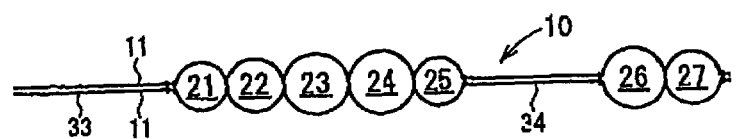
FIG. 1B is a sectional view of a curtain airbag along line B-B of FIG. 1A.
Figure 1C:
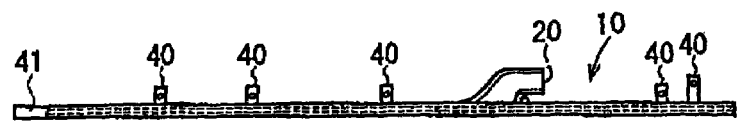
FIG. 1C is a side view of a curtain airbag in a folded state.

FIG. 1A shows a side view of an airbag according to an embodiment of the present invention. In the example shown in FIG. 1A, the airbag 10 may include two layers of sheets 11, which may be combined with each other via a linear connected portion 12 extending around the periphery of the airbag 10. A part of the linear connected portion 12 may extend towards the central portion of the airbag 10. Layers may also be connected via linear connected portions 13, 14, 15, 16, 17, 18, 31, and 32 extending at the inner side of the periphery. When gas is introduced between the sheets 11, the airbag 10 becomes inflated. The linear connected portions 13, 14, 15, 16, 17, 18, 31, and 32 may be formed by using connecting means, such as stitching, bonding, welding, or other methods known in the art.

A substantially L-shaped projection extends from the upper edge of the airbag 10 and is disposed near the center of the upper edge with respect to the longitudinal direction of the airbag 10. The projection is provided with a gas-entrance hole 20 for the airbag 10. The gas-entrance hole 20 may be connected with a gas generator (not shown) for inflating the airbag 10.

The linear connected portions 13, 14, 15 may be connected with the lower side of the linear connected portion 12 and extend upward from the lower side, but are not connected with the upper side of the linear connected portion 12. The linear connected portion 17 may have a substantially rectangular shape. The linear connected portion 16 may extend downward from an upper front section of the linear connected portion 17 so as to form a substantially L-shape, but is not connected with the lower side of the linear connected portion 12.

The linear connected portion 18 may extend upward from the rear side of the linear connected portion 12 to form a substantially L-shape, but is not connected with the upper side of the linear connected portion 12.

The linear connected portions 12, 13, 14, 15, 16, 17, 18 may define long separate chambers 21, 22, 23, 24, 25, 26, 27 extending in the vertical direction. The upper portions of the chambers 21, 22, 23, 24, 26 and 27 may communicate with the gas-entrance hole 20 via the chamber 30.

The lower portion of the chamber 25 may communicate with the lower portion of the chamber 24. The upper side of the linear connected portion 17 and the upper side of the linear connected portion 12 may have a long horizontal chamber 28 disposed therebetween, and the lower side of the linear connected portion 17 and the lower side of the linear connected portion 12 may have a long horizontal chamber 29 disposed therebetween.

The chambers 26 and 27 may communicate with the gas-entrance hole 20 via the chamber 28. The lower portions of the chambers 25 and 26 may communicate with each other via the chamber 29. The inner region of the linear connected portion 17 may define a non-inflatable portion 34.

The front side of the linear connected portion 12 is disposed distant from the front edge of the curtain airbag 10 towards the rear of the curtain airbag 10. The curtain airbag 10 may have non-inflatable portions 33 at its front region. The curtain airbag 10 may have three tab-like or short-belt-like attachment parts 41, 42, and 43, which respectively extend forward from an upper section, a lower section, and an intermediate section of the front edge of the curtain airbag 10. The attachment parts 41, 42, and 43 may be each provided with a through-hole through which a mounting component, such as a bolt or a rivet, can be inserted. When they are disposed over top of one another, the attachment parts 41, 42, and 43 may be mounted at an intermediate position of the front pillar with respect to the vertical direction by using a common mounting component. This way, the number of mounting components and the number of mounting processes can be reduced. Alternatively, the attachment parts may be mounted on the front pillar in a separate manner at different positions.

The attachment parts 41 and 43 may have a U-shaped linear connected portion 31 therebetween, and the attachment parts 43 and 42 may have a U-shaped linear connected portion 32 therebetween.

The rear sides of the linear connected portions 31 and 32 may be disposed adjacent to the front side of the linear connected portion 12.

The upper edge of the curtain airbag 10 may be provided with a plurality of earlobe-like tabs 40 disposed at intervals along the upper edge. Each tab 40 may be mounted on a roof-side rail by using a mounting component, such as a bolt, rivet, or other fastening method known in the art.

Figure 1D:
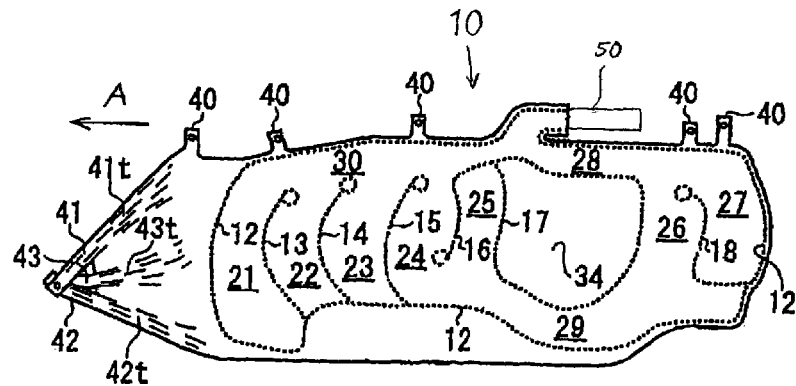
FIG. 1D is a side view of the curtain airbag of FIG. 1A in a deployed state with attachment parts mounted on a pillar of a vehicle.

FIG. 1A illustrates an inflated state in which attachment parts are not mounted on a front pillar, whereas FIG. 1D illustrates an inflated state in which the attachment parts are mounted on the front pillar.

Once the airbag is installed on the front pillar and the roof-side rail the airbag is covered with an appropriate cover, such as a pillar trim or a roof trim (not shown).

According to a curtain airbag device having the structure described above, when a vehicle is involved in a side-on collision or rollover, an inflator 50 is activated in order to supply the airbag 10 with gas. The gas from the inflator inflates the curtain airbag 10 as shown in FIG. 1D. In the example shown in FIG. 1D, because the attachment parts 41, 42, and 43 are mounted together at a common position of the front pillar, high tensions are generated at areas 41t, 42t, and 43t, which are rear extensions of the attachment parts 41, 42, and 43, respectively. This creates a state in which the high-tensile areas 41t, 42t, and 43t are strained. Consequently, the non-inflatable portions 33 in the front region of the curtain airbag 10 form a hammock-like structure. When the body of a vehicle occupant hits against these hammock-like portions, the body is caught and received by low-tensile areas intervening between the high-tensile areas 41t, 42t, and 43t. This improves restraint of the vehicle occupant inside the vehicle.

According to an embodiment of the present invention, when the curtain airbag is deployed, a high tension is generated in the front-rear direction of the vehicle body at both the upper and lower portions of the front region of the curtain airbag. Accordingly, when the body of a vehicle occupant hits against the front region of the curtain airbag, the body is automatically drawn towards the center of the curtain airbag with respect to the vertical direction. This contributes to a further improvement in the function for holding a vehicle occupant inside a vehicle cabin.

Figure 2A:
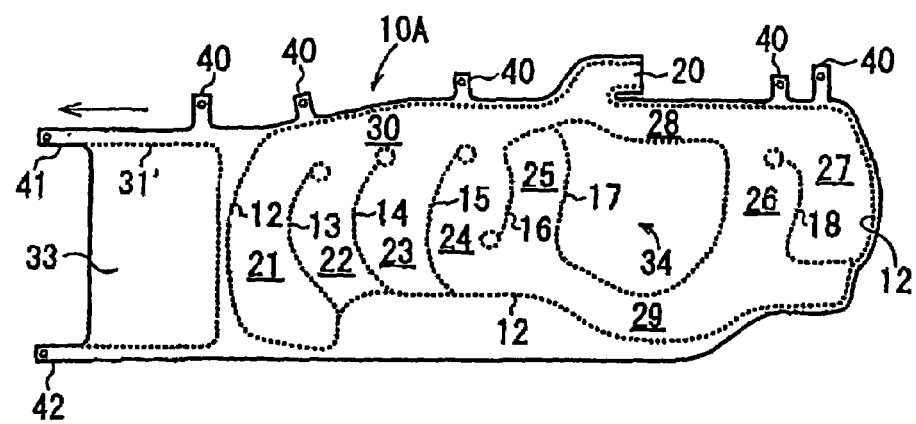
FIG. 2A is a side view of a curtain airbag according to an alternative embodiment.
Figure 2B:
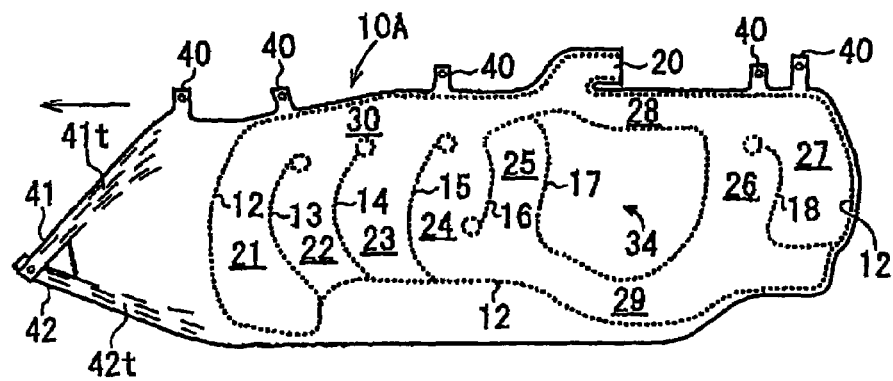
FIG. 2B is a side view of the curtain airbag of FIG. 2A in a deployed state with attachment parts mounted on a pillar of a vehicle.

According to an embodiment of the present invention, FIGS. 2A and 2B illustrate a curtain airbag 10A provided with only two attachment parts disposed at the upper and lower sections of a curtain airbag 10A. When the curtain airbag 10A is inflated, the high-tensile areas 41t and 42t, which are rear extensions of the attachment parts 41 and 42, may be formed. Consequently, one non-inflatable portion 33 in the front region of the curtain airbag 10A forms a hammock-like structure. This improves the properties for restraining the body of a vehicle occupant from moving towards the outside of a vehicle. Furthermore, the non-inflatable portion 33 may be surrounded by a U-shaped linear connected portion 31'.

According to the present invention, if the overall length of the front pillar is defined as L, the attachment parts 41 and 42 or the attachment parts 41 to 43 may be mounted on the front pillar at a position within a distance range of (0.5×L) to (0.9×L) from the top end of the front pillar. Alternatively, the attachment parts 41 and 42 or the attachment parts 41 to 43 may be mounted on the front pillar at different positions. In this case, the distance between the mounting positions (namely, the distance between the uppermost attachment part and the lowermost attachment part) may be set at 10 cm or less.

Figure 3:
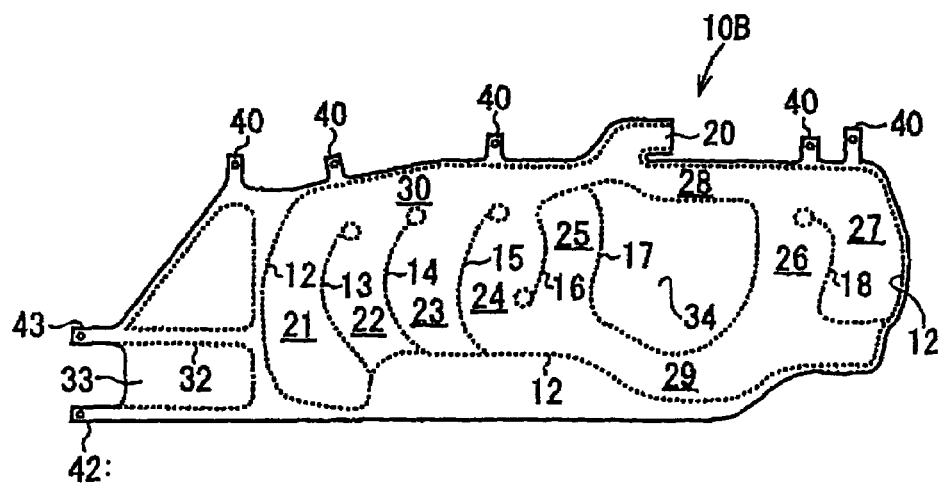
FIG. 3 illustrates a curtain airbag according to another alternative embodiment.

According to an embodiment of the present invention, the curtain airbag may have an structure in which an upper portion of the front edge of the curtain airbag is inclined towards the rear, as shown in FIG. 3. In FIG. 3, a portion of the front edge above the attachment part 43 is inclined and the attachment part 41 is not provided.

The priority application JP 2004-175679, filed Jun. 14, 2004, is incorporated by reference herein.

Given the disclosure of the present invention, one versed in the art would appreciate that there may be other embodiments and modifications within the scope and spirit of the invention. For example, the inflatable chambers may be set at positions other than those shown in the drawings. Moreover, the rear side of the curtain airbag may also be provided with attachment parts to be mounted on, for example, a C pillar. Furthermore, a guiding mechanism for guiding the inflating curtain airbag may be provided. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A curtain airbag module comprising:
   a curtain airbag adapted to extend along a front pillar and a roof side of a vehicle;
   an inflator;
   wherein a front edge of the curtain airbag is adapted to extend along the front pillar and the airbag is provided with attachment parts that are disposed at multiple sections of a front edge of the airbag with respect to a vertical direction, wherein the attachment parts are adapted to be mounted on the front pillar, and
   wherein the attachment parts are adapted to be mounted at a common intermediate position or adjacent intermediate positions of the front pillar with respect to the vertical direction,
   wherein the attachment parts are non-inflatable, wherein the attachment parts extend from a non-inflatable portion of the airbag to mounting portions formed in the attachment parts,
   wherein the attachment parts are provided in at least three sections of the front edge of the curtain airbag, said at least three sections including an upper section, a lower section, and an intermediate section of the airbag.

2. The curtain airbag module according to claim 1, wherein the attachment parts are adapted to be mounted on the front pillar with a common mounting component.

3. The curtain airbag module according to claim 1, wherein the front pillar has a length of L and the attachment parts are adapted to be mounted on the front pillar at a position within a distance range of (0.5×L) to (0.9×L) from a top end of the front pillar.

4. A curtain airbag module, comprising:
   an inflator;
   a curtain airbag adapted to extend along a side of a vehicle, wherein the airbag includes attachment parts adapted to be mounted to a pillar of the vehicle and at least one non-inflatable portion that is connected to and extends between the attachment parts,
   wherein the attachment parts form high tensile areas and each non-inflatable portion creates a low tensile area at an end of the airbag to cause the airbag to restrain an occupant within the vehicle,
   wherein the attachment parts each have a separate end with a separate mounting portion from one another,
   wherein the attachment parts are provided in at least three sections of a front edge or back edge of the curtain airbag, said at least three sections including an upper section, a lower section, and an intermediate section of the airbag with non-inflatable portions connected to and extending between each of the upper section, the lower section, and the intermediate section.

5. The curtain airbag module according to claim 4, wherein the attachment parts are adapted to be mounted on a front pillar or a rear pillar of the vehicle with a common mounting component.

6. The curtain airbag module according to claim 4, wherein the attachment parts are configured to create high tensile areas at the upper section, the intermediate section, and the lower section, and the non-inflatable portions are configured to create low tensile areas between the upper section and intermediate section and between the lower section and intermediate section.

7. The curtain airbag module according to claim 4, wherein a pillar has a length of L and the attachment parts are adapted to be mounted on a front pillar or a back pillar of the vehicle at a position within a distance range of (0.5×L) to (0.9×L) from a top end of the pillar.

8. The curtain airbag according to claim 4, wherein the attachment parts are non-inflatable.

9. The curtain airbag according to claim 4, wherein each non-inflatable portion is located immediately adjacent to an inflatable portion of the airbag.

10. The curtain airbag according to claim 4, wherein each non-inflatable portion extends in an axial direction of the airbag between an inflatable portion of the airbag to a position located rearward of mounting portions formed in the attachment parts.

11. The curtain airbag according to claim 4, wherein each non-inflatable portion is comprised of a sheet of fabric that is connected to and extends between the attachment parts.

12. A curtain airbag, comprising:
    a curtain airbag with attachment parts provided at an end of the airbag, wherein the attachment parts are adapted to be mounted on a pillar or a vehicle, wherein the curtain airbag includes at least one non-inflatable portion that is connected to and extends between the attachment parts;
    wherein the attachment parts create high tensile areas and each non-inflatable portion creates a low tensile area at an end of the airbag to cause the airbag to restrain an occupant within the vehicle;
    wherein the attachment parts each have a separate end with a separate mounting portion from one another,
    wherein the attachment parts are provided in at least three sections of a front edge of the curtain airbag, said at least three sections including an upper section, a lower section, and an intermediate section of the airbag with non-inflatable portions connected to and extending between each of the upper section, the lower section, and the intermediate section.

13. The curtain airbag according to claim 12, wherein the attachment parts are adapted to be mounted on a front pillar of the vehicle with a common mounting component.

14. The curtain airbag according to claim 12, wherein the attachment parts create high tensile areas at the upper section, the intermediate section, and the lower section, and the non-inflatable portions are configured to create low tensile areas between the upper section and intermediate section and between the lower section and intermediate section.

15. The curtain airbag according to claim 12, wherein a front pillar of the vehicle has a length of L and the attachment parts are adapted to be mounted on the front pillar of the vehicle at a position within a distance range of (0.5×L) to (0.9×L) from a top end of the front pillar.

16. A curtain airbag device, comprising:
    a curtain airbag configured to extend along a front pillar and a roof side of a vehicle,
    a gas generator configured to inflate the curtain airbag,
    wherein a front edge of the curtain airbag extends along the front pillar and is provided with attachment parts disposed at multiple sections of the front edge with respect to a vertical direction of the curtain airbag, the attachment parts being mounted on the front pillar, and
    wherein the attachment parts are mounted at a common intermediate position or adjacent intermediate positions of the front pillar with respect to the vertical direction, wherein a non-inflatable portion is provided at a front portion of the curtain airbag between two adjacent attachment parts, wherein the attachment parts are provided in at least three sections of the front edge of the curtain airbag, said at least three sections including an upper section, a lower section, and an intermediate section.

17. The curtain airbag device of claim 16, wherein the attachment parts are mounted on the front pillar with a common mounting component.

18. A curtain airbag device, comprising:

a curtain airbag configured to extend along a front pillar and a roof side of a vehicle, a gas generator configured to inflate the curtain airbag, wherein a front edge of the curtain airbag extends along the front pillar and is provided with attachment parts disposed at multiple sections of the front edge with respect to a vertical direction of the curtain airbag, the attachment parts being mounted on the front pillar, and wherein the attachment parts are mounted at a common intermediate position or adjacent intermediate positions of the front pillar with respect to the vertical direction, wherein a non-inflatable portion is provided at a front portion of the curtain airbag between two adjacent attachment parts, wherein the non-inflatable portion is surrounded by a U-shaped linear connected portion between the two adjacent attachment parts.

* * * * *